US008746939B2

(12) United States Patent
Williams et al.

(10) Patent No.: US 8,746,939 B2

(45) Date of Patent: Jun. 10, 2014

(54) CRYSTAL OFF-AXIS LED HEADLAMP

(75) Inventors: Bruce Preston Williams, Grosse Pointe Park, MI (US); Mahendra Somasara Dassanayake, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 13/290,490

(22) Filed: Nov. 7, 2011

(65) Prior Publication Data

US 2013/0114282 A1 May 9, 2013

(51) Int. Cl.

*F21V 5/04* (2006.01)

*B60Q 1/04* (2006.01)

(52) U.S. Cl.

USPC ............ 362/507; 362/516; 362/517; 362/336

(58) Field of Classification Search

CPC ............... B60Q 1/00; B60Q 1/04; F21V 5/04

USPC ......... 362/516, 517, 518, 521–522, 246, 326, 362/507, 336, 244; 313/114

See application file for complete search history.

(56) References Cited

U.S. PATENT DOCUMENTS

| | | | | |
|---|---|---|---|---|
| 7,040,792 | B2 | 5/2006 | Brandenburg et al. | |
| 7,401,960 | B2 | 7/2008 | Pond et al. | |
| 7,731,401 | B2 | 6/2010 | King et al. | |
| 7,731,402 | B2 | 6/2010 | Tessnow et al. | |
| 8,256,943 | B2 * | 9/2012 | Nagafuchi et al. | 362/545 |
| 2007/0230190 | A1 * | 10/2007 | Sasaki | 362/336 |
| 2008/0062712 | A1 | 3/2008 | Woodward | |
| 2008/0316761 | A1 | 12/2008 | Minano et al. | |
| 2010/0202153 | A1 | 8/2010 | Schwab | |

FOREIGN PATENT DOCUMENTS

WO 2011029493 A1 3/2011

* cited by examiner

*Primary Examiner* — Karabi Guharay

(74) *Attorney, Agent, or Firm* — Raymond Coppiellie; Price Heneveld LLP

(57) ABSTRACT

A light assembly for motor vehicles includes a body made of a light-transmitting material. The light-transmitting material preferably includes a front light-emitting surface, and a plurality of rear surface portions that provide for inward reflection of light from a plurality of LEDs or other light sources. The reflective surface portions may be in the form of truncated parabolas having flat upper, lower, and/or side surfaces to reduce the overall height and/or width of the light assembly. The reflective surfaces can be oriented at off-axis relative to a vehicle axis to provide a specific beam intensity and direction.

16 Claims, 8 Drawing Sheets

CRYSTAL OFF-AXIS LED HEADLAMP

FIELD OF THE INVENTION

The present invention generally relates to lights, and in particular to lights that may be utilized as headlights for vehicles.

BACKGROUND OF THE INVENTION

Various headlights for motor vehicles have been developed. Conventional headlights typically utilize an incandescent light source, a reflector, and a lens. Headlights utilizing LED light sources have also been developed. However, known headlights may suffer from various drawbacks.

SUMMARY OF THE INVENTION

One aspect of the present invention is a light assembly for a motor vehicle of the type that defines a horizontal axis extending in fore and aft directions through a center of the vehicle. The light assembly comprises a body formed of a light-transmitting material. The body defines a light-emitting surface extending between first and second sides of the body. The body further defines a back side that is opposite the light emitting surface. The body includes first and second rows of inner reflective medium boundaries, wherein a first portion of the inner reflective medium boundaries are generally parabolic, and define focal points. A second portion of the inner medium boundaries are approximately planar. The first row of inner reflective medium boundaries extends along the first side of the body with the second portions of the first row of inner reflective medium boundaries facing generally inwardly, and wherein the second row of inner reflective medium boundaries extends along the second side of the body with the second portions of the second row of inner reflective medium boundaries facing generally inwardly. The light assembly further includes first and second rows of light sources, wherein at least one light source is positioned at the focal point of each inner reflective surface. The light-transmitting material may comprise polymer, glass, or other suitable material. The light-transmitting material is preferably substantially transparent. However, the light-transmitting material could be translucent or tinted. The reflective medium boundaries may comprise an exterior surface of the light-transmitting material, whereby a substantial portion of the light from the light sources is reflected internally. The parabolic outer surfaces of the body may be coated with chrome or other reflective material to ensure that light from the light sources is reflected internally. The light-emitting surface may be flat, or it may be convexly or concavely contoured to correspond with, for example, adjacent outer surfaces of a vehicle. The light-emitting surface may also include parallel raised ridges and grooves to form smaller surface variations to direct light from the light-emitting surface and/or provide a distinctive appearance. The parabolic medium boundaries may be arranged such that the axis of individual parabolic surfaces converge or diverge to provide a specific light distribution pattern as a required for a particular application. One row of the parabolic surfaces may be configured to provide a high beam, and the other row of parabolic surfaces may be configured to provide a low beam. The body may include a third row of reflective surfaces having parabolic portions to provide a running light for a vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
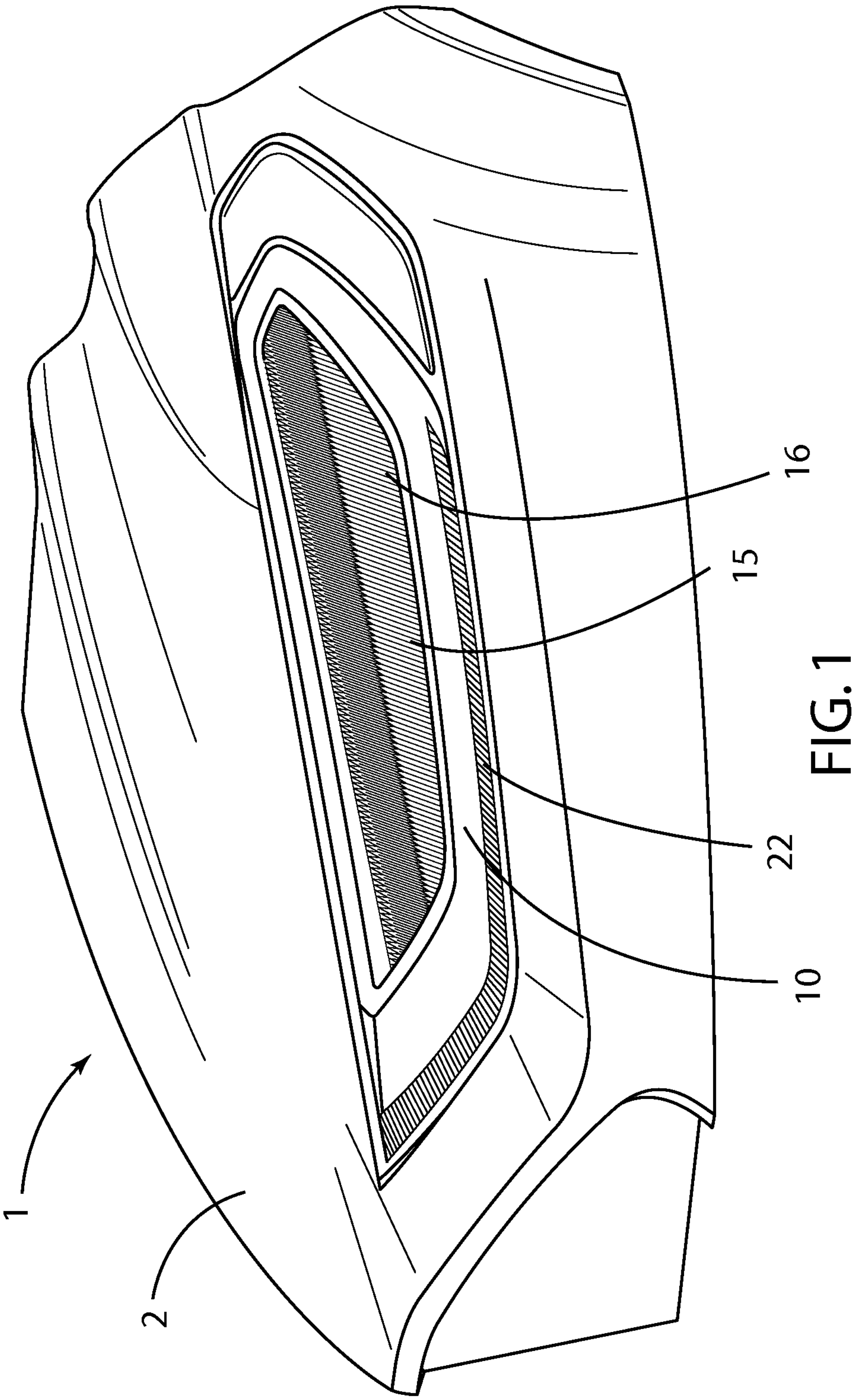
FIG. 1 is a partially fragmentary isometric view of a light assembly and a portion of a vehicle according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specifications are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 according to one aspect of the present invention may include an outer surface 2 and a light assembly 10. As discussed in more detail below, light assembly 10 comprises a light subassembly 14 including light sources such as LEDs 20 that are mounted in a body 15 having a plurality of truncated parabolic rear surface portions and a light-emitting front surface 16. LEDs 20 are mounted in body 15 of light subassembly 14 and provide light that is projected forwardly from light-emitting front surface 16 of body 15. Body 15 may comprise a molded clear acrylic material having an appearance that is somewhat similar to that of a crystal material. The light-emitting surface 16 may have a surface contour or shape that closely corresponds to the outer surfaces 2 of the vehicle 1.

Figure 2:
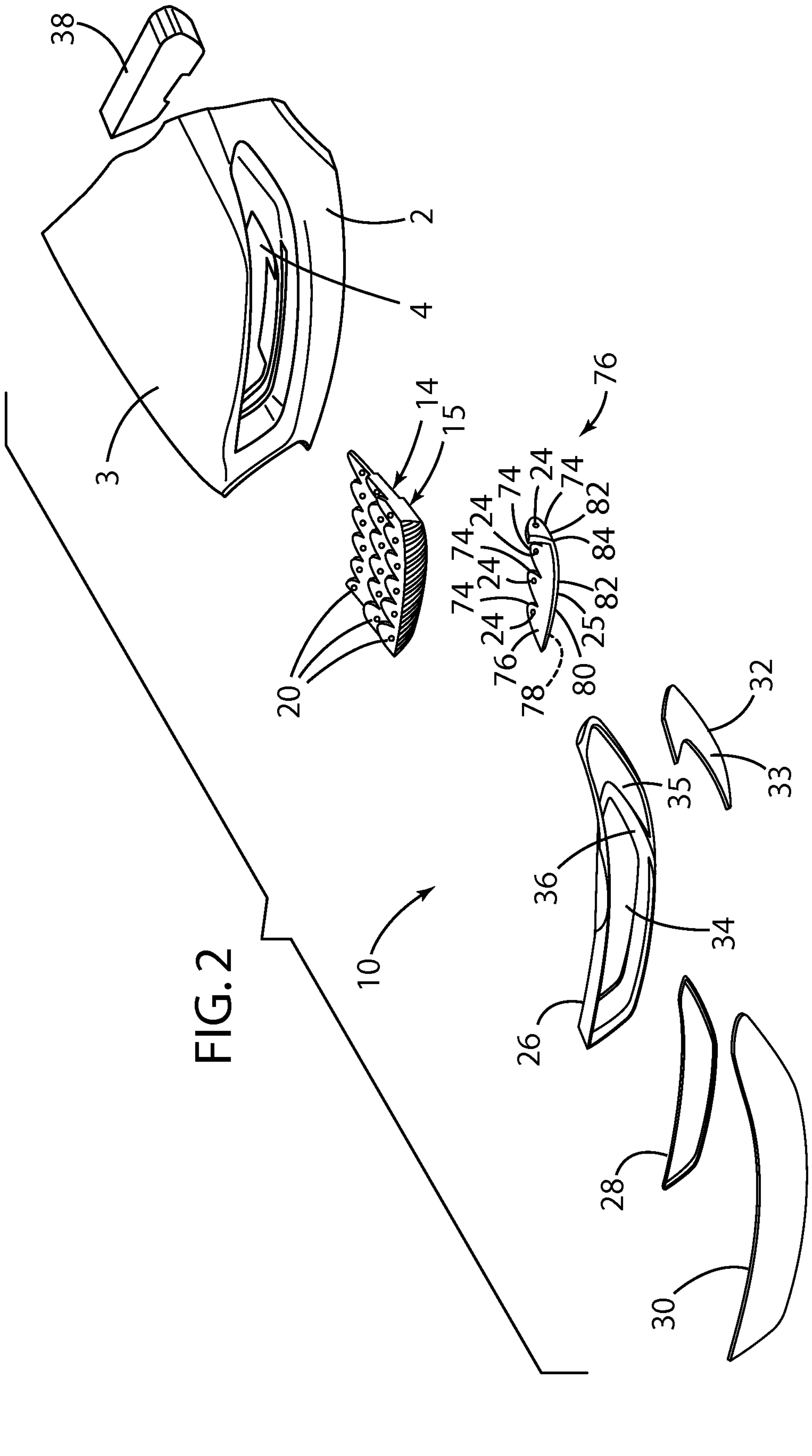
FIG. 2 is an exploded isometric view of a light assembly according to one aspect of the present invention.

With further reference to FIG. 2, a front portion 3 of vehicle 1 includes an opening or cavity 4 that receives body 15 of light assembly 10. Although FIG. 2 shows a front left portion of a vehicle, it will be understood that a right front of vehicle 1 may include a light assembly 10 that is a mirror image of the one shown in FIGS. 1-4. LEDs 20 are connected to a vehicle power source (not shown) by conductors such as wires 18 (FIG. 4). It will be understood that a suitable electrical circuit (not shown) may be utilized to provide the required electrical power from a conventional 12 volt DC power source. The body 15 is made of a light-transmitting material such as polymer, glass, or other suitable material that may be clear, tinted, etc. to provide the desired light-transmitting properties. Light assembly 10 may further include a plurality of LEDs 24 mounted to a light guide 22 that forms park and turn lights. The light assembly 10 may further include a bezel 26, trim ring 28, and lens cover 30. In the illustrated example, the bezel 26, trim ring 28 and lens cover 30 are molded of a suitable polymer material. The bezel 26 and trim ring 28 may be molded of a colored or opaque polymer material, and lens cover 30 is preferably made from a clear acrylic material that is molded or otherwise formed to the proper shape. Trim ring 28 mounts to bezel 26, and covers opening 34 in bezel 26. Reflex plate 32 is preferably made of a relatively thin yellow or orange acrylic polymer material, and may include a textured outer surface 33. Reflex plate 32 mounts to bezel 26 and covers opening 36 in bezel 26 to provide turn signal lighting. A divider 36 extends across bezel 26 to form openings 34 and 35.

Figure 3:
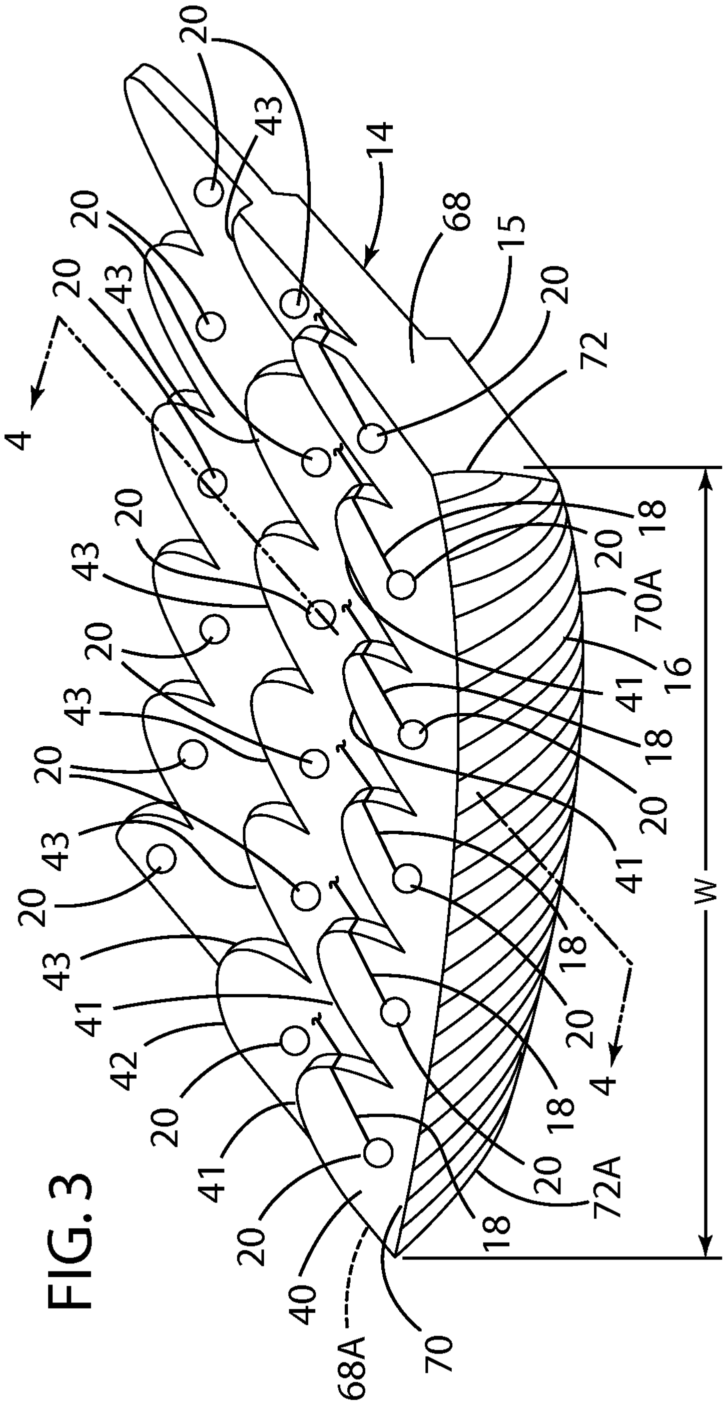
FIG. 3 is an isometric view of a light assembly according to one aspect of the present invention.
Figure 4:
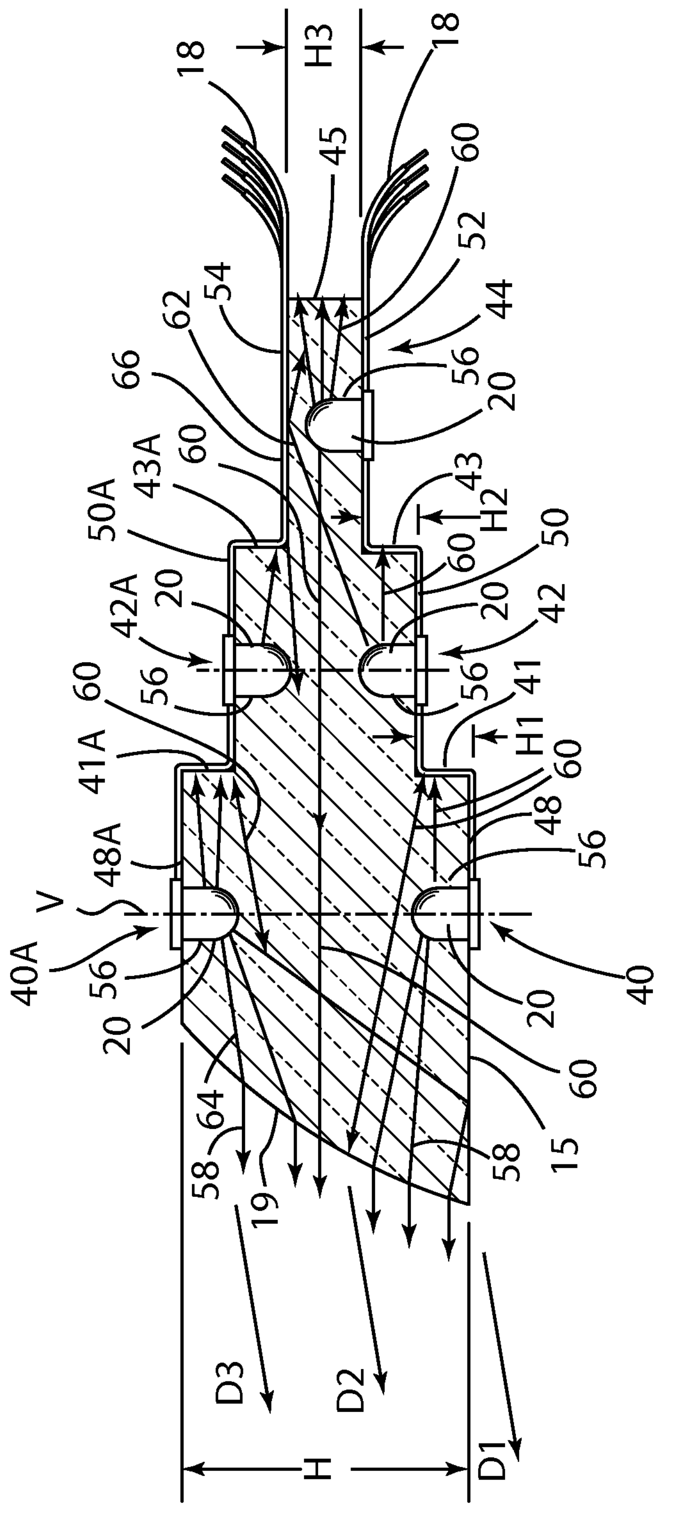
FIG. 4 is a cross-sectional view of the light of FIG. 3 taken along the line 4-4.

With reference to FIG. 3, body 15 includes a upper first row 40 of first upper parabolic surface portions 41 (see also FIG. 4), a second upper row 42 of second upper parabolic surface portions 43, and a third row 44 of parabolic surface portions 45. Third row 44 is generally in a horizontal central plane of body 15. Body 15 may also include a lower first row 40A of lower parabolic surfaces 41A, and a second lower row 42A of parabolic surfaces 43A. Parabolic surface portions 41 are truncated by flat side surfaces 48, and parabolic surface portions 43 are truncated by flat side surfaces 50. Parabolic surface portions 45 are truncated by upper flat side surface 52 and by lower flat side surface 54. Parabolic lower surface portions 41A and 43A are truncated by lower flat side surfaces 48A and 50A, respectively. A plurality of cavities 56 are molded or otherwise formed in body 15 to receive LEDs 20. The cavities 56 may be configured to closely receive the LEDs 20, and are configured to maximize the amount of light from LEDs 20 that is absorbed internally within body 15. The LEDs 20 and cavities 56 are preferably positioned at the focal points of the parabolic surface portions 41, 42, 45, 40A, and 43A.

Referring specifically to FIG. 4, a portion of the light from LEDs 20 travels through the body 15, and out of the body 15 at surface 16 as shown by rays 58. Another portion of the light from LEDs 20 is reflected internally from the medium boundaries defined by parabolic surface portions 41, 41A, 43, 43A, and 45. Because the LEDs 20 are positioned at the focal point of the parabolic surface portions, the light 60 that reaches the medium boundaries formed by the parabolic surface portions is reflected internally back towards light emitting front surface 16 of body 15. The material utilized to form body 15 is selected to provide a refractive index relative to air whereby total internal reflection occurs at the medium boundaries defined by the parabolic surface portions. Although imperfections in the parabolic surfaces may cause some of the light to escape through the parabolic surface portions, the material utilized to form body 15 and the shape of the parabolic surface portions is selected to maximize or increase the amount of light that is reflected internally. However, the parabolic and flat surface portions may also be coated with a layer of reflective material 66 that may comprise aluminum or other material suitable for forming a mirror surface.

Some of the light from LEDs 20 is reflected internally from the flat side surfaces 48, 50, 52, and 54 as shown by the ray 62. Some of the light 62 eventually reflects off one of the parabolic surface portions, and is reflected forwardly and out of the light-emitting front surface 16. Still further, some of the light from LEDs 20 reflects from a medium boundary defined by flat side surface portions 50, 52, or 54 as shown by light ray 64, and this light is then emitted from light-emitting front surface 16 of body 15.

The combination of the parabolic and flat surfaces described above ensures that a significant percentage of the light produced by LEDs 20 exits the light-emitting front surface 16 of body 15. Some of the light emitted from surface 16 is directed in a forward direction, and some of the light is directed off-axis relative to vehicle axis "A". The shape and configurations of the parabolic surface portions and flat truncated surface portions may be selected to provide a desired light intensity/light beam shape. Furthermore, the shape of front light-emitting surface 16 may be selected to direct light forward in desired directions as shown by the arrows D1, D2, and D3 (FIG. 4). The light may be directed forwardly, and it may include upwardly or downwardly directed components if required to provide a desired light beam/light intensity distribution.

Figure 5:
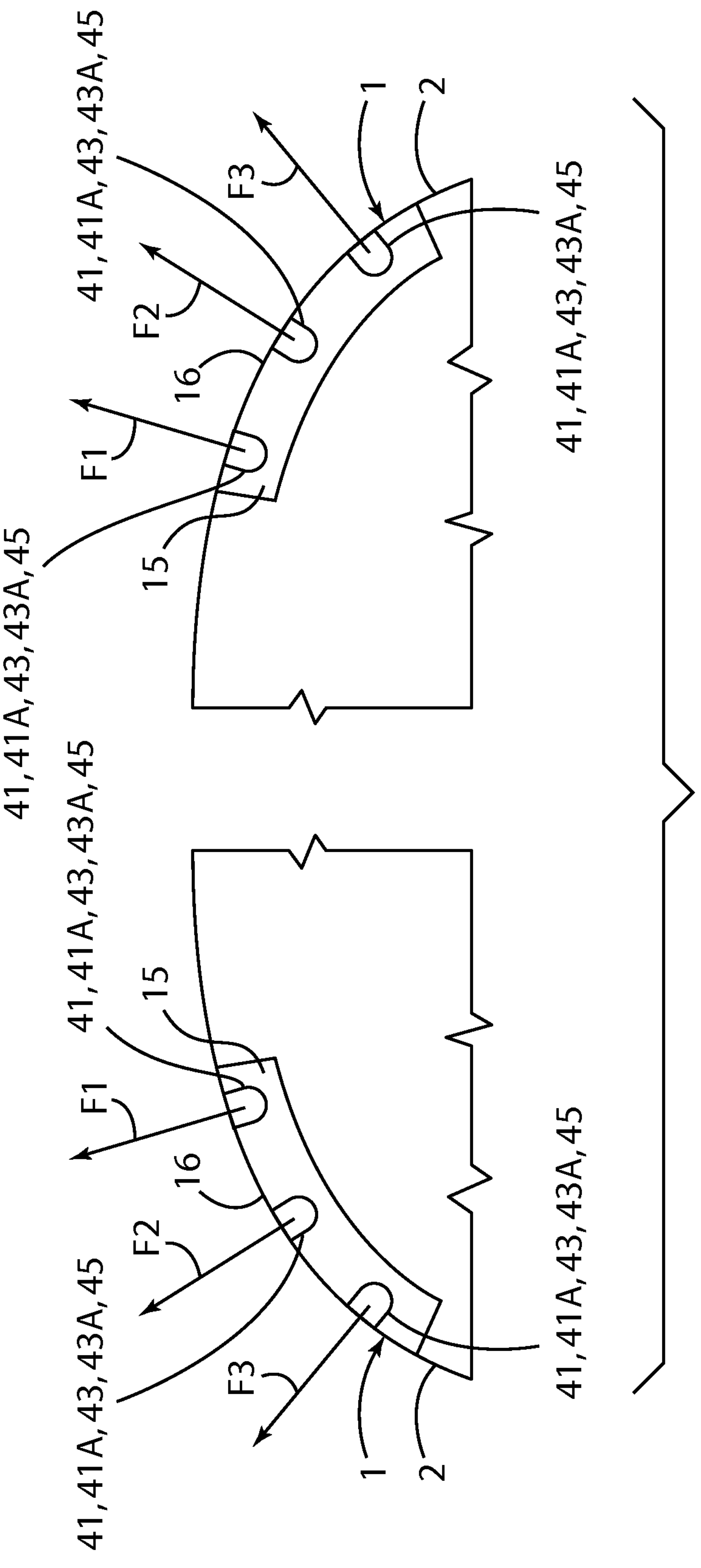
FIG. 5 is a partially fragmentary schematic top plan view of a front portion of a vehicle including light assemblies according to the present application.

With further reference to FIG. 5, the parabolic surface portions 41, 41A, 43, 43A, and 45 may also be configured to direct light in a forward direction F1, or in directions F2 and F3 that include sidewardly-directed components. The angular orientation of the parabolic surface portions about a vertical axes can be aligned to provide for forwardly-directed light. Alternately, the axes of the parabolic surface portions can be directed either inwardly or outwardly to provide for off-axes projection of light relative to the vehicle forward axis "A".

Referring again to FIG. 4, the parabolic surface portions 41, 41A, 43, 43A, and 45 may comprise three dimensionally-curved surface portions with a focal point at LEDs 20. Alternately, the parabolic surface portions may comprise two-dimensional curved surfaces that extend about a vertical axes "V" extending through LEDs 20. In general, the vertical heights "H1," "H2," "H3," of parabolic surface portions 41, 43, and 45, respectively, is selected to provide the required degree of forward reflection of light from LEDs 20 while simultaneously providing an overall height dimension "H" for the body 15 so as to provide an aesthetically pleasing appearance when the light 10 is mounted in a motor vehicle as shown in FIG. 1. Although the parabolic surface portions do not necessarily reflect all of the light from LEDs directly forward due to the truncation of the parabolic surfaces by the flat side surfaces 48, 50, 52, and 54, the number and intensity of the LEDs and other variables can be selected to ensure that the overall light intensity distribution provided by the light assembly 10 is sufficient for a particular application.

Figure 4A:
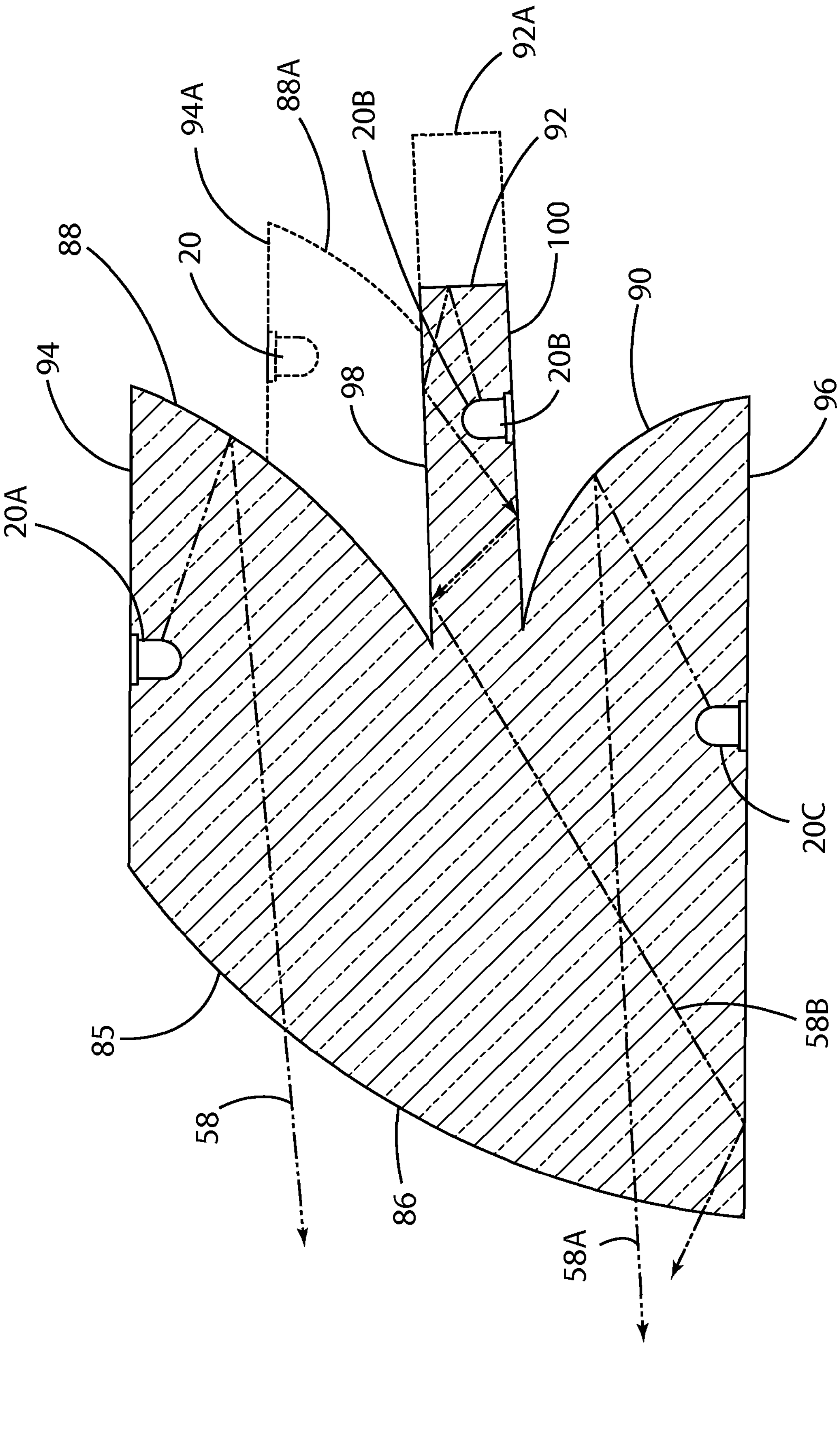

With further reference to FIG. 4A, a body 85 for a light assembly according to another aspect of the present invention includes a front light-emitting surface 86, and upper and lower parabolic surface portions 88 and 90, respectively. The parabolic surfaces 88 and 90 are truncated by upper flat surface 94 and lower flat surface 96. A central parabolic surface portion 92 is truncated by upper and lower flat surfaces 98 and 100, respectively. LEDs 20A, 20B, and 20C are positioned at the focal points of parabolic surface portions 88, 90, and 92 respectively. As shown by the arrows 58A, light from the upper and lower LEDs 20A and 20C, respectively, is reflected internally from the parabolic surface portions 88 and 90, whereby the light rays 58A escape through front light-emitting surface 86 of body 85. Light from LED 20B may be reflected internally from surface portions 92, 98, 100, and 96 as shown by the arrow 58B. The surfaces of body 85 (other than front light-emitting surface 86) may be coated with a reflective material to ensure that the light rays are reflected internally at the medium boundaries until the light escapes from the front light-emitting surface 86.

It will be understood that the body 85 of FIG. 4A may include additional rows of parabolic surface portions 88 and 90 to thereby increase the overall height of the body 85. Vertically adjacent pairs of LEDs and associated parabolic surface portions may be staggered relative to one another if required to provide the required shape and light distribution pattern for a particular application. An example of one possible configuration including an additional row of LEDs and associated parabolic surfaces is shown by the dashed lines 88A and 92A in FIG. 4A. A flat outer surface 94A provides for mounting of an LED at the focal point of the parabolic surface portion 88A. The central parabolic surface portion 92 may be made larger as shown by the dashed line 92A in FIG. 4A to accommodate additional rows of LEDs. An additional row of lower LEDs (not shown) may be added in a similar manner. The number of rows of LEDs and associated parabolic surface portions can be varied as required to meet the needs of a particular application.

In the illustrated example, body 15 includes opposite vertical side surfaces 68 and 68A that truncate portions of the outer parabolic surface portions. The light-emitting front surface 16 of body 15 is defined by a generally horizontal upper edge or corner 70, a lower edge or corner 70A, and upwardly extending opposite side edges or corners 72 and 72A. The contour of light-emitting front surface 16 and the shapes of the peripheral edges 70, 70A, 72, and 72A can be selected to closely correspond to the outer surface 2 of a motor vehicle 1. Also, the number and length of the rows of LEDs 20 and parabolic surface portions can be chosen to provide a desired overall height H and width W (FIG. 3). In the illustrated example, the height H is about 2-3 inches, and the width W is about 6-10 inches. However, the height H could be about the same as the width W, or the height H could be substantially greater than the width W. The number of parabolic surface portions and LEDs in each row can be selected to provide the desired width W, and the number of rows of parabolic surface portions and LEDs can be selected to provide the desired height H. Also, the individual rows of LEDs may be non-linear. Still further, the sizes and configurations (e.g. heights H1, H2, H3, etc.) of the reflective surfaces can also be varied as required. Still further, the length of individual rows of LEDs and/or the shape (e.g. non-linear) can be chosen to provide a shape that is not rectangular. A very wide range of overall shapes can be provided by selecting the number and length of rows of LEDs.

Figure 6:
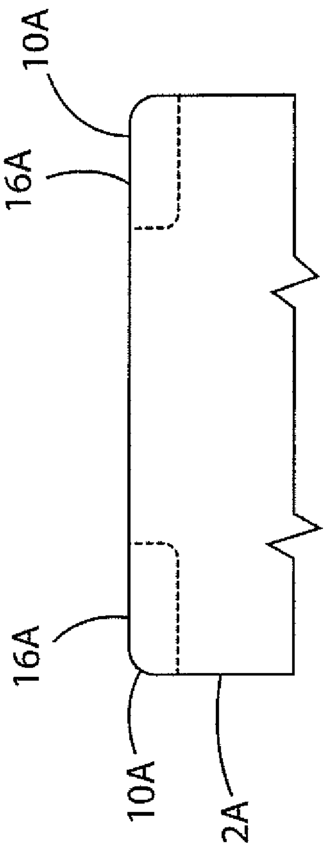
FIG. 6 is a partially fragmentary schematic top plan view of a front portion of a vehicle including light assemblies according to the present application.
Figure 8:
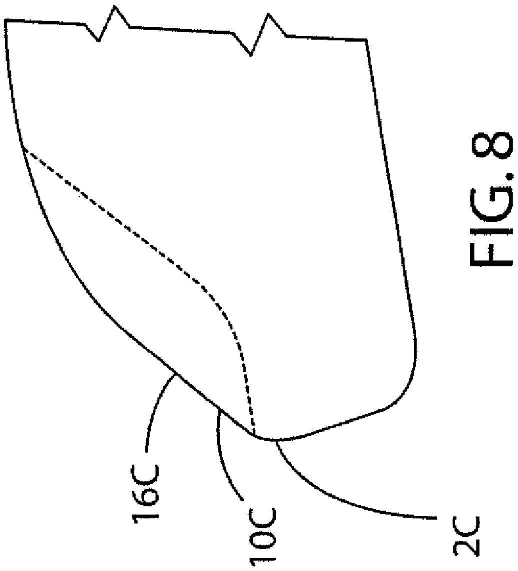
FIG. 8 is a partially fragmentary side elevational view of a front portion of a vehicle and light assembly according to another aspect of the present invention.
Figure 7:
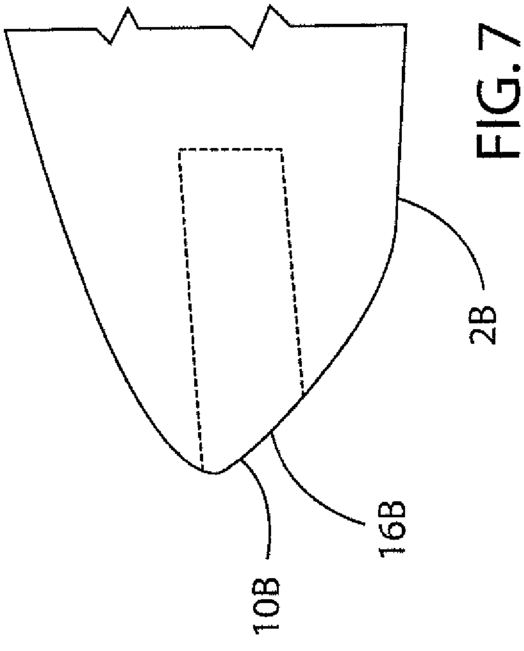
FIG. 7 is a partially fragmentary side elevational view of a front portion of a vehicle and light assembly according to another aspect of the present invention.
Figure 10:
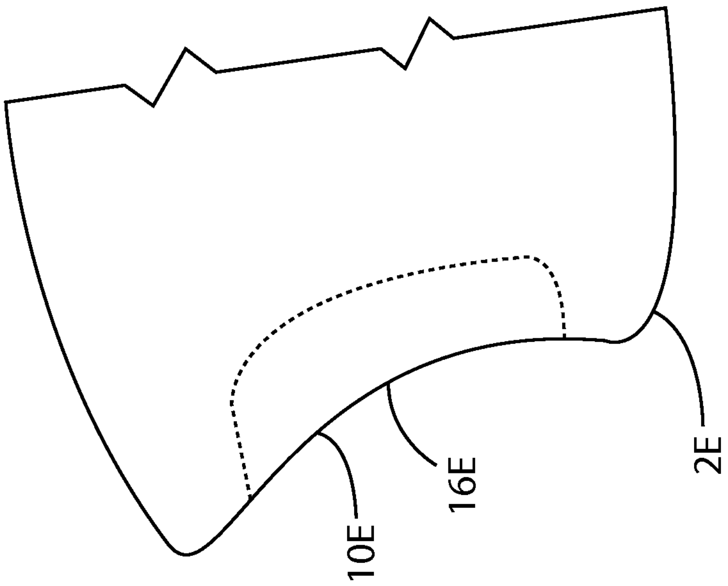
FIG. 10 is a partially fragmentary side elevational view of a front portion of a vehicle and light assembly according to another aspect of the present invention.
Figure 9:
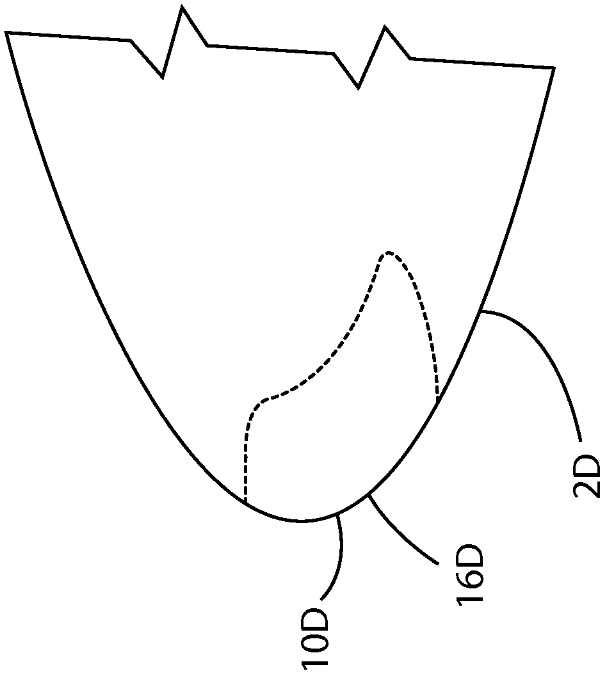
FIG. 9 is a partially fragmentary side elevational view of a front portion of a vehicle and light assembly according to another aspect of the present invention.

As shown in FIG. 4, the front light-emitting surface 16 may have a convex curvature in a vertical cross-section and face forward and down, or it may face forward and up as shown by dashed line 19. Also, the front surface 16 may have a convex surface in plan view as shown in FIG. 5. In general, the light-emitting surface may have almost any shape required to follow or accent an outer surface contour of a motor vehicle. For example, surface 16A of a light assembly 10A (FIG. 6) closely follows that of vehicle outer surface 2A. Furthermore, as shown in FIG. 7, surface 16B of light assembly 10B closely follows a surface 2B of a vehicle in a side elevational view. In general, the light-emitting surface may have a variety of contours such as an upwardly-facing convex surface contour 16C (FIG. 8) of a light assembly 10C which closely follows vehicle surface 26, a downwardly-facing convex surface 16D (FIG. 9) of a light assembly 10D which closely follows vehicle surface 2D, or a concave surface 16E (FIG. 10) of a light assembly 10E which closely follows vehicle surface 2E that can be directed downwardly, or upwardly, or a combination thereof.

Referring again to FIG. 2, park/turn light guide 22 may be molded from a clear acrylic material that is substantially similar to the material utilized to form body 15. The light guide 22 includes a body 25 having a plurality of parabolic rear surface portions 74 and flat upper and lower surface portions 76 and 78, respectively. A plurality of LEDs 24 are mounted at the focal points of the parabolic reflective surface portions 74 to provide for forward projection of light produced by LEDs 24. In the illustrated example, the body 25 includes a generally flat main portion 80, an upwardly-extending end portion 82, and a front surface 84. When assembled, the flat main portion 80 is positioned along lower flat side surface 48A (FIG. 4) of body 15, and angled end 82 is positioned directly adjacent side surface 68 (FIG. 3) of body 15. When assembled, end 82 of light guide 22 is positioned behind amber reflex plate 32 to provide a turn signal. It will be understood that the LED 24 (or LEDs) disposed in angled end 82 are separately controlled to provide the turn signal function. The LED's 24 positioned along the generally horizontal flat main portion 80 of park/turn light guide 22 may be separately controlled to provide a park light having less light intensity than provided by the headlight of light subassembly 14.

In general, the light sub assembly 14 and/or park/turn light guide, trim, lens covers, and other such components may have a variety of configurations as required for a particular application. In this way, the overall contour of the vehicle surface 2 can be designed first, and the light assembly 10 can then be designed to fit the profile of outer surface 2 of a motor vehicle. The outer lens cover 30 (FIG. 2) and/or reflex plate 32, along with the bezel 26 and trim ring 28 can be configured to smoothly blend in with the vehicle surface 2. Furthermore, it will be understood that the bezel, trim ring, and lens cover may not be required in all applications. Furthermore, the park/turn light guide may also not be required for some applications, or the park/turn light guide 22 may be utilized with conventional incandescent headlights.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A light assembly for motor vehicles of the type that define a horizontal axis extending in fore and aft directions through a center of the vehicle, the light assembly comprising:

a body formed of a light-transmitting material, the body defining a light-emitting surface extending between first and second opposite sides of the body, the body further defining a back side that is opposite the light-emitting surface, wherein the body includes a first and second row of inner reflective surfaces, wherein a first portion of the inner reflective surfaces are generally parabolic and define focal points, and wherein a second portion of the inner surfaces are approximately planar, and wherein the first row of inner reflective surfaces extends along the first side of the body with the second portions of the first row of inner reflective surfaces facing generally inwardly, and wherein the second row of inner reflective surfaces extends along the second side of the body with the second portions of the second row of inner reflective surfaces facing generally inwardly;

first and second rows of light sources, wherein at least one light source is positioned at the focal point of each inner reflective surface.

2. The light assembly of claim 1, wherein:

the light sources comprise LEDs, each having a base side and an opposite light-emitting side that emits light, and wherein the LEDs are positioned with the base surfaces facing outwardly and the light-emitting sides facing inwardly towards the first portions of the reflective inner surfaces.

3. The light assembly of claim 2, wherein:

each LED defines an axis extending from the base side to the light-transmitting side, and wherein the axis of each LED extends transversely relative to the axis of the inner reflective surface of the reflective inner surface with which the LED is associated.

4. The light assembly of claim 1, wherein:

the first and second portions of the inner reflective surfaces are formed by generally dome-shaped outer surfaces of the body.

5. The light assembly of claim 1, wherein:

the first and second rows of inner reflective surfaces each include at least three discrete inner reflective surfaces.

6. The light assembly of claim 1, wherein:

the first side of the body comprises an upper side of the body;

the second side of the body comprises a lower side of the body;

the first row of inner reflective surfaces is configured to form a first plurality of discrete beams of light directed in a first direction to form high beams; and the second row of inner reflective surfaces is configured to form a second plurality of discrete beams of light directed in a second direction such that the second plurality of discrete beams diverges downwardly from the first plurality of discrete beams.

7. The light assembly of claim 6, wherein:

at least one of the first plurality of discrete beams of light overlaps an adjacent one of the first plurality of discrete beams of light.

8. The light assembly of claim 1, wherein:

the body includes a third row of inner reflective surfaces between the first and second rows of inwardly reflective inner surfaces.

9. The light assembly of claim 8, wherein:

each inner reflective surface of the third row of inner reflective surfaces has generally flat opposite portions that are generally parallel to the second portions of the first and second rows of inner reflective surfaces.

10. A headlight for a vehicle comprising:

a one-piece integral body comprising transparent polymer material including a curved front surface and a rear surface having horizontal rows of truncated parabolic portions configured to internally reflect light; and LEDs positioned to transmit light into the transparent polymer material whereby the light travels through the transparent polymer material and then reflects internally and exits the front surface to form diverging light beams.

11. The headlight of claim 10, wherein:

the truncated reflective portions include planar horizontal portions that internally reflect light from the LEDs whereby the light reflected from the planar horizontal portions travels through the transparent polymer material before exiting the front surface.

12. The headlight of claim 11, wherein:

the one-piece integral polymer body includes planar upper and lower surfaces that form the planar horizontal portions.

13. The headlight of claim 10, wherein:

the front surface has a convex curvature.

14. The headlight of claim 10, including:

a coating of reflective material on the rear surface.

15. A headlight for vehicles, comprising:

a plurality of LEDs; and a one piece integral body comprising light-transmitting polymer material including a smoothly curved light-emitting front surface and a back side including first and second rows of internally reflective truncated parabolic surfaces whereby light from the LEDs travels through the polymer material and reflects internally to form pluralities of beams exiting the front surface and diverging vertically to form high and low beams.

16. The headlight of claim 15, wherein:

the light-transmitting polymer material is transparent.

* * * * *